United States Patent
Gorokhov

(10) Patent No.: US 7,873,575 B1
(45) Date of Patent: Jan. 18, 2011

(54) DYNAMIC CREDIT SPREAD MODEL

(75) Inventor: Denis Gorokhov, Hoboken, NJ (US)

(73) Assignee: Morgan Stanley, New York, NY (US)

( * ) Notice: Subject to any disclaimer, the term of this patent is extended or adjusted under 35 U.S.C. 154(b) by 352 days.

(21) Appl. No.: 12/072,174

(22) Filed: Feb. 25, 2008

(51) Int. Cl.
*G06Q 40/00* (2006.01)
(52) U.S. Cl. ........................................ 705/41
(58) Field of Classification Search .................. 705/36
See application file for complete search history.

(56) References Cited

U.S. PATENT DOCUMENTS

| | | | |
|---|---|---|---|
| 7,599,871 B1 * | 10/2009 | Borland | 705/36 R |
| 2004/0128221 A1 * | 7/2004 | Pandher | 705/36 |
| 2005/0044029 A1 * | 2/2005 | Griffin et al. | 705/36 |
| 2006/0190377 A1 * | 8/2006 | Stanley et al. | 705/35 |

OTHER PUBLICATIONS

Hybrid Equity-Credit Modeling. Atlan et al., Equities & Derivatives Quantitative R&D, BNP Paribas, Jul. 25, 2005.*
Hull, "Chap. 21: Credit Derivatives," Options, Futures, and Other Derivatives, 6th ed., Prentice Hall, 2006, pp. 507-524.

* cited by examiner

*Primary Examiner*—Hani Kazimi
*Assistant Examiner*—Clifford Madamba
(74) *Attorney, Agent, or Firm*—K&L Gates LLP

(57) ABSTRACT

Systems and methods for calculating a value of a credit hybrid. The value of the credit hybrid is determined based on a model of the forward hazard rate that is based on a stochastic differential equation that includes a jump term for the hazard rate. The jump term may be based on a non-negative function of the hazard rate and a Poisson process. In addition, the stochastic differential equation may include a drift term for the hazard rate and a Brownian motion term for the hazard rate. The value of the credit hybrid may be determined by calibrating the model using calibration data and then calculating the value of the credit hybrid using the calibrated model. Both the calibration and the valuation steps may utilize Monte Carlo simulations.

15 Claims, 1 Drawing Sheet

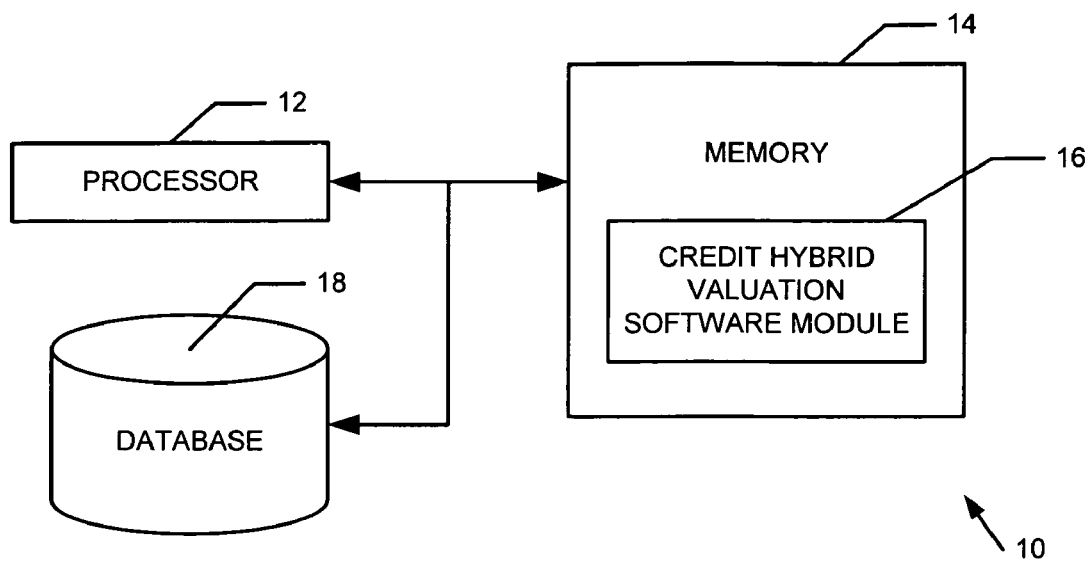
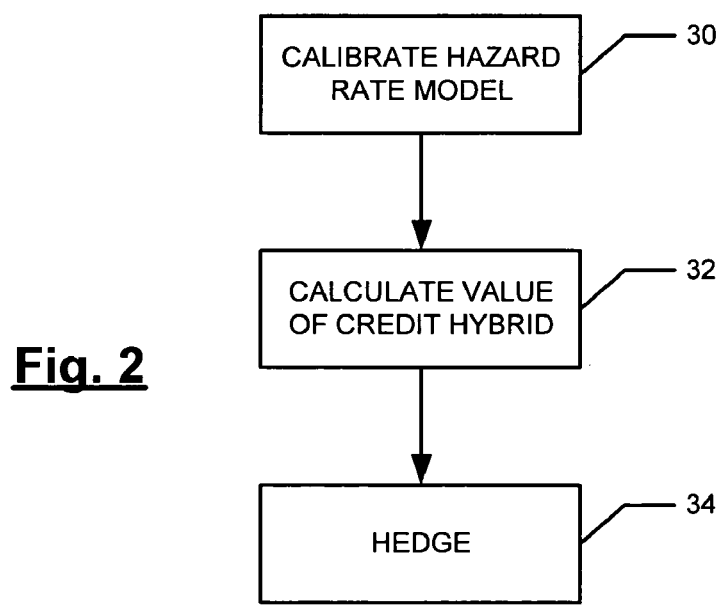

DYNAMIC CREDIT SPREAD MODEL

BACKGROUND

Credit hybrids can be considered to be financial instruments with at least two sources of risk. Typically, one of those risks is credit risk, such as the risk that a party will experience an adverse credit event, such as insolvency or defaulting on a loan or bond obligation. Other risks that may be implicated in a credit hybrid include interest rate risk and foreign exchange risk. Many such credit hybrids are difficult to price because there typically is not a liquid market for such instruments. Nevertheless, a party owning such credit hybrids has an interest in pricing them, particularly when determining how to hedge the instruments.

Because there typically is no liquid market for such credit hybrids, they are often priced using mathematical models. It is known that the price of an instrument that is dependent upon the credit risk of a party is related to the probability of survivability of that party. The probability of survivability of the party, denoted $P_{surv}$, at the end of future time $\tau$, measured at time t can be expressed as:

$$P_{surv}(t) = e^{-\int_0^\tau h(s,s)ds} \quad (1)$$

where h(t,t) is the instantaneous hazard rate. In the past, it was known to model the forward hazard rate with the following stochastic equation:

$$dh_{tT} = \mu_{tT}^h dt + \sigma_{tT}^h dB_t^h, \quad B_t^h \in R^1 \quad (2)$$

where T is the maturity of the corresponding hazard rate, $\mu_{tT}^h dt$ is the hazard rate drift term, $\sigma_{tT}^h$ is the hazard rate volatility, and $B_t^h$ is the continuous-time Brownian motion. A general discussion of this model is contained in P. J. Schonbucher, "Term structure modeling of defaultable bonds," The Review of Derivatives Studies, Special Issue: Credit Risk, 2(2/3): 161-192, 1998. While this model is valuable, it does not address any issues related to a proper treatment of the credit volatility skew, such as the probability of credit spreads going up is greater than the probability spreads going down and vice versa.

SUMMARY

In one general aspect, the present invention is directed to systems and methods for calculating a value of a credit hybrid. According to various embodiments, the value of the credit hybrid is determined based on a model of the forward hazard rate that is based on a stochastic differential equation that includes a jump term for the hazard rate. The jump term may be based on a non-negative function of the hazard rate and a Poisson process. In addition, the stochastic differential equation may include a drift term for the hazard rate and a Brownian motion term for the hazard rate. The value of the credit hybrid may be determined by calibrating the model using calibration data and then calculating the value of the credit hybrid using the calibrated model. Both the calibration and the valuation steps may utilize Monte Carlo simulations.

The present invention presents an advancement over the prior art. The model of the present invention, according to various embodiments of the present invention, can generate various types of credit skew—both upward and downward sloping. In addition, the model provides an explicit form for continuous time volatility and jumps of hazard rates, which allows the model to be calibrated to observable market instruments, such as credit defaults swaps and at-the-money credit default swap options. These and other benefits will be apparent from the description below.

FIGURES

Various embodiments of the present invention are described herein by way of example in conjunction with the following figures, wherein FIG. 1 is a diagram of a system according to various embodiments of the present invention; and FIG. 2 is a flowchart of a process performed by the system of FIG. 1 according to various embodiments of the present invention.

DETAILED DESCRIPTION

Various embodiments of the present invention are directed to systems and method for valuing credit hybrids. Credit hybrids may be any financial instrument with at least two sources of risk. Usually, one of those sources is credit risk, e.g., the risk a party will experience an adverse credit event, such as insolvency or defaulting on a loan or bond obligation. Other risks that may be implicated in a credit hybrid include interest rate risk and foreign exchange risk. The price of the credit hybrid may be related to the probability of survivability ($P_{surv}$) of the party, which may be expressed as:

$$P_{surv}(t) = e^{-\int_0^\tau h(s,s)ds} \quad (3)$$

where h(t,t) is the instantaneous hazard rate, as mentioned above. According to various embodiments, the forward hazard rate may be modeled using the following stochastic differential equation:

$$dh_{tT} = \mu_{tT}^h dt + \sigma_{tT}^h dB_t^h + G(h_{tT})dN_t, \quad B_t^h \in R^1 \quad (4)$$

where T is the maturity of the corresponding hazard rate, $\mu_{tT}^h$ is the drift term, $\sigma_{tT}^h$ is the hazard rate volatility, $B_t^h$ is a continuous-time Brownian motion function, $G(h_{tT})$ is a non-negative function of the hazard rate $h_{tT}$, and $N_t$ is a compound Poisson process with frequency $\lambda$. According to various embodiments, the jumps $dN_t$ may be distributed according to some probability distribution $\rho$. In comparing equation (4) to equation (2), it can be seen that equation (4) has an additional term describing the jumps of the hazard rates, namely $G(h_{tT})dN_t$. The process Nt may be independent of all other processes.

The drift of hazard rates $\mu_{tT}^h$ may be the sum of two terms. The first term may be determined by the hazard rate diffusion $\sigma_{tT}^h dB_t^h$ and the second term may be determined by the jump term $G(h_{tT})dN_t$. The drift can be calculated by requiring that under the risk-free measure the risky bond price grows from the risk-free rate on average. A standard analysis (see, e.g., C. Chiarella and C. Sklibosios, "A Class of Jump-Diffusion Bond Pricing Models within the HJM Framework, Springer 10 (2), 87-127 (2003, which is incorporated herein by reference) plus an assumption about exponential distribution of the jumps $dN_t$, $\rho(J) = e^{-J}$, where $J = N_{\phi+\delta} - N_{\phi-\delta}$, where $\phi$ is the jump rate and $\delta \to 0$, lead to the following expression for the drift:

$$\mu_{tT}^h = \mu_{tT}^{HPF} - \frac{\lambda G(h_{tT})}{\left(1 + \int_t^T G(h_{ts})ds\right)^2}$$

where $\mu_{tT}^{HPF} = \sigma_{tT}^h \int_t^T \sigma_{ts}^h ds + \sigma_{tT}^r \kappa_t \int_t^T \sigma_{ts}^h ds + \sigma_{tT}^h \int_t^T \sigma_{ts}^r \kappa_t ds$, with $\sigma_{tT}^r$ the interest rate volatility and $\kappa_t$ the correlation between interest rates and hazard rates.

The function G(x) may be implemented as follows:

$$G(x) = J_0 \theta(x) \quad (5)$$

where $J_0$ is the average jump size and $\theta(x)$ is a step function ($\theta(x)=0$ when $x<0$ and $\theta(x)=1$ when $x\geq 0$). This choice of the function G(x) corresponds to the parallel upward shifts of the hazard rates curve if a jump occurs. The step function guarantees that hazard rates stay non-negative. The continuous-time volatility function is chosen to be a product of the function depending only on t and T, and a certain power of hazard rate h(t, T). This specification allows the model to be calibrated to market instruments.

For computational implementation purposes, a lattice version of the continuous-time evolution equation (1) may be used:

$$h_{i+1,j} = h_{ij} + \mu_{ij}^h \delta_i + \sqrt{\delta_i} \sigma_{ij}^h B_{i+1}^h + G(h_{ij})(N_{i+1} - N_i) \quad (6)$$

where $\delta_i$ is the time step. From a computational point of view it is convenient to evaluate a variable $\Theta_{ij}^h$ which is related to the drift by:

$$\Theta_{ij}^h = \sum_{k=i+1}^{j-1} \Delta_k^h \mu_{ik}^h \quad (7)$$

where $\Delta_k^h$ is the day count basis for hazard rates. This expression leads to:

$$\Theta_{ij}^h = \Theta_{ij}^{h,HPF} - \frac{\lambda \sum_{k=i+1}^{j-1} \Delta_k^h G(h_{ik})}{1 + \sum_{k=i+1}^{j-1} \Delta_k^h G(h_{ik})} \quad (8)$$

where G(x) is given by equation (5) above and $$\Theta_{ij}^{h,HPF} = \quad (9)$$

$$\sum_{k=i+1}^{j-1} \Delta_k^h \mu_{ik}^h = \frac{1}{2} \left( \sum_{k=k+1}^{j-1} \Delta_{ik}^h \sigma_{ik}^h \right)^2 + \sum_{l=i+1}^{j-1} \sum_{k=k+1}^{j-1} \Delta_k^r \sigma_{ik}^r \Delta_l^h \sigma_{il}^h \cdot \kappa_{i+1},$$

with $\Delta_k^r$ the interest rate day count fraction. The drift $\mu_{iT}^h$ is related to $\Theta_{ij}^h$ via $$\mu_{iT}^h = \frac{\Theta_{i,j+1}^h - \Theta_{i,j}^h}{\Delta_j^h} \quad (10)$$

Using equations (6), (7), and (8), the values for $h_{ij}$ on the grid can be determined. The value of hazard rates at the points not coinciding with the grid points may be obtained using the standard Brownian bridge methodology.

FIG. 1 is a diagram of a computer system 10 according to various embodiments of the present invention. The system 10 comprises one or more processors 12 and one or more memory units 14. For convenience, only one processor 12 and one memory unit 14 are shown in FIG. 1. The computer system 10 may be implemented as one or a number of networked computer devices, such as personal computers, laptops, servers, server blades, workstations, mainframes, etc. The processor(s) 12 may be a single or multiple core processor. The memory unit may comprise any suitable computer memory unit, including solid state memory (such as RAM or ROM) and/or mass storage devices (such as optical or magnetic mass storage devices). As shown in FIG. 1, the memory unit 14 may comprise a credit hybrid valuation software module 16 that comprises computer instruction code, which when executed by the processor 12, causes the processor to model the forward hazard rates and value a credit hybrid as described above. The calculated valuation may be stored in the memory unit 14 or in another storage unit associated with the computer device 10. Also, the calculated valuation may be transmitted via a network to another computer device. A database 18 may store historical data to calibrate the model, as described further below.

FIG. 2 is a simplified diagram of a process performed by the processor 12 when executing the code of the credit hybrid valuation software module 16 according to various embodiments of the present invention. At step 30, the hazard rate model may be calibrated. According to various embodiments, the CDS spreads and the at-the-money CDS option volatilities may be specified. Next, the initial hazard rates and the hazard rate volatility $\sigma_{ij}^h$ may be calibrated. The parameters $\lambda$ and $J_0$ may be chosen to provide the best fit to the hazard rate volatility smile.

According to various embodiments, this initial forward hazard rate curve $h_{0T}$ may be determined using CDS (credit default swaps) quote and maturity data (which may be stored in the database 18), the cooked interest rate discount curve, interest rate and hazard rate volatility grids, and the correlation between the interest rate and spread processes as inputs for the calibration. In addition, the recovery rates and CDS conventions (e.g., accrual rule, business calendars, etc.) are also preferably specified. The points corresponding to the end of the constant intervals coincide with the CDS maturities $T_n$, n=1, . . . , N, with N being the number of CDSs used in the calibration. The calibration process may consist of subsequent solutions of N equations corresponding to the N CDSs:

$$C_n E^Q \left\{ \sum_i P_{0i} Z_{0i} \right\} = (1-R) E^Q \left\{ \sum_j (P_{0,j-1} - P_{0j}) Z_{0j} \right\} - \quad (11)$$

$$C_n E^Q \left\{ \sum_j Accr(t_j, T_{m(j)})(P_{0,j-1} - P_{0j}) Z_{0j} \right\}$$

where $E^Q$ is the average under the discrete time martingale measure and $C_n$ is the coupon paid on the nth CDS. Indices i and j correspond to the coupon and default payment respectively. The recovery rate is denoted by R, where $0<R<1$. Finally, $Accr(t_j, T_{m(j)}) = (t_j - T_{m(j)})/DCB$ is the accrual fraction determining the coupon accrual in the event of default, with DCB being the date count basis, e.g., Act360.

The average for equation (11) may be performed via Monte Carlo simulation (MCS). First, equation (11) may be solved for n=1 and the hazard rate in the interval $0<t<T_1$ is found. Next, equation (11) may be solved for n=2 assuming that the hazard is already known for $0<t<T_1$. This gives $h_{0t}$ in the interval $T_1<t<T_2$. By extending this procedure until n=N, the whole curve $h_{0t}$ can be obtained.

According to various embodiments, the MCS calibration procedure can be performed using one of two user-selected options. In a first option, every simulation run in the calibration procedure uses a constant number of paths. In the second option, the model is calibrated using a reduced number of paths. Then the CDS inputs are repriced using approximate hazard rates and the specified number of paths. Next, the CDS quotes are corrected and calibrated using the reduced number of paths. The second calibration option appears to be remarkably accurate and approximately ten times faster than the first option explained above. In addition, a further variation of the second option is to increase the default leg discretization time step and, hence, decrease the number of cashflows, which further reduces the calibration time.

In another embodiment, the model can be calibrated by using an approximate analytic formula for the convexity correction arising due to the correlation between interest rates and hazard rates instead of using MCS. A continuous-time calculation shows that:

$$E^Q\{P_{0,j-1}Z_{0j}\} = \tilde{Z}_{0t_j}\frac{Z_{0t_j}}{Z_{0t_{j-1}}}E^Q\left\{\exp\left(d\,s\int_0^{t_{j-1}}\left(\sum_{st_j}^r - \sum_{st_{j-1}}^r\right)\cdot\kappa_s\sum_{st_{j-1}}^h\right)\right\} \quad (12)$$

where $$\Sigma_{tT}^r = -\int_t^T ds\sigma_{sT}^r \quad (13)$$

and $$\Sigma_{tT}^h = -\int_t^T ds\sigma_{sT}^h \quad (14)$$

Equation (12) may be hard in some cases to evaluate exactly since the interest rate and hazard rate volatilities might depend on the interest rates and the hazard rates. However, if the volatilities are not too high, it is possible to substitute the initial interest rate and credit curves into equation (12) and evaluate the convexity correction analytically. Equation (12) may also be used to price various credit hybrid trades, such as options on CDSs and CDS spreads.

After the model has been calibrated, at step 32, the theoretical value of the credit hybrid may be determined using the above-described model for the forward hazard rate (see equation (6) for example). According to various embodiments, MCS may be used to compute the theoretical value of the credit hybrid. The computed value may be the average of a number of simulation trials. Next, at step 34, a party owning the credit hybrid can make one or more trades to hedge the credit hybrid.

One way to increase the accuracy of the computed value is to increase the number of MSC paths. This, however, comes at the cost of increased computation time. One way to increase the accuracy without increasing the number of paths is a finite sample adjustment (FSA). Using FSA, a certain relation is enforced to be satisfied for a finite number of paths N. A suitable quantity for FSA is the price of a risky zero coupon bond. This price depends on the initial hazard and interest rate forward rates. Assume that simulated discount factors $d_1, d_2, \ldots, d_N$ and survival probabilities $p_1, p_2, \ldots, p_N$ (N is the number of paths) up to time t have been simulated. FSA could then be done as follows. First, the discount factors $d_1, d_2, \ldots, d_N$ are adjusted in a standard way, the new discount factors being designated for purposes of this description as $\tilde{d}_1, \tilde{d}_2, \ldots, \tilde{d}_N$. Next, the correction $\gamma$ to the survival probabilities may be determined using the equation:

i.e.

$$\frac{1}{N}\sum_{k=1}^N \tilde{d}_i p_i e^\gamma = \tilde{Z}_{0t}$$

$$\gamma = \ln\frac{N\tilde{Z}_{0t}}{\sum_{k=1}^N \tilde{d}_i p_i}$$

Next, the survival probabilities can be shifted using the relation $\tilde{p}_i = p_i e^\gamma$.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments.

It is to be understood that the figures and descriptions of the embodiments have been simplified to illustrate elements that are relevant for a clear understanding of the embodiments, while eliminating, for purposes of clarity, other elements. For example, certain operating system details and modules of network platforms are not described herein. Those of ordinary skill in the art will recognize, however, that these and other elements may be desirable in a typical processor or computer system. However, because such elements are well known in the art and because they do not facilitate a better understanding of the embodiments, a discussion of such elements is not provided herein.

In general, it will be apparent to one of ordinary skill in the art that at least some of the embodiments described herein may be implemented in many different embodiments of software, firmware and/or hardware. The software and firmware code may be executed by a processor or any other similar computing device. The software code or specialized control hardware which may be used to implement embodiments is not limiting. For example, embodiments described herein may be implemented in computer software using any suitable computer software language type, such as, for example, C or C++ using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media. Such media may include any of the forms listed above with respect to storage devices and/or, for example, a modulated carrier wave, to convey instructions that may be read, demodulated/decoded, or executed by a computer or computer system.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent and/or semitemporary. A computer-readable medium may further include one or more data signals transmitted on one or more carrier waves.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations and adaptations to those embodiments may occur to persons skilled in the art with attainment of at least some of the advantages. The disclosed embodiments are therefore intended to include all such modifications, alterations and adaptations without departing from the scope of the embodiments as set forth herein.

What is claimed is:

1. A system for valuing a credit hybrid, the system comprising:
    at least one processor; and
    at least one computer readable memory unit in communication with the at least one processor, wherein the at least one memory unit comprises computer instructions which, when executed by the at least one processor, cause the at least one processor to calculate a value for the credit hybrid based on a forward hazard rate model that models the forward hazard rate based on a stochastic differential equation that includes a jump term for the hazard rate, wherein the jump term is based on a non-negative function of the hazard rate and a discontinuous process and wherein the stochastic differential equation additionally includes a drift term for the hazard rate and a Brownian motion term for the forward hazard rate, and wherein the stochastic differential equation is:

$$dh_{tT} = \mu_{tT}^h dt + \sigma_{tT}^h dB_t^h + G(h_{tT})dN_t$$

where T is the maturity of a corresponding hazard rate, $\mu_{tT}^h$ is a drift term, $\sigma_{tT}^h$ is a hazard rate volatility, $B_t^h$ is a continuous-time Brownian motion function, $G(h_{tT})$ is a non-negative function of the hazard rate $h_{tT}$, and $N_t$ is a discontinuous process with frequency $\lambda$, and $G(h_{tT})dN_t$ is the jump term.

2. The system of claim 1, wherein the at least one memory unit further comprises computer instructions which, when executed by the at least one processor, cause the at least one processor to calibrate the forward hazard rate model.

3. The system of claim 2, further comprising a database in communication with the at least one processor for storing calibration data used to calibrate the forward hazard rate model.

4. The system of claim 1, wherein the discontinuous process is a Poisson process.

5. A system for valuing a credit hybrid, the system comprising:
    at least one processor;
    a database in communication with the at least one processor, wherein the database comprises calibration data, and
    at least one computer readable memory unit in communication with the at least one processor and the database, wherein the at least one memory unit comprises computer instructions which, when executed by the at least one processor, cause the at least one processor to:
    calibrate, using the calibration data stored in the database, a forward hazard rate model that models the forward hazard rate based on a stochastic differential equation that includes a jump term for the hazard rate, wherein the jump term is based on a non-negative function of the hazard rate and a discontinuous process, wherein the stochastic differential equation additionally includes a drift term for the hazard rate and a Brownian motion term for the forward hazard rate, wherein the stochastic differential equation is:

$$dh_{tT} = \mu_{tT}^h dt + \sigma_{tT}^h dB_t^h + G(h_{tT})dN_t$$

where T is the maturity of a corresponding hazard rate, $\mu_{tT}^h$ is a drift term, $\sigma_{tT}^h$ is a hazard rate volatility, $B_t^h$ is a continuous-time Brownian motion function, $G(h_{tT})$ is a non-negative function of the hazard rate $h_{tT}$, and $N_t$ is a discontinuous process with frequency $\lambda$, and $G(h_{tT})dN_t$ is the jump term; and
    calculate a value for the credit hybrid based on the calibrated forward hazard rate model.

6. The system of claim 5, wherein the at least one processor is programmed to calculate the value of the credit hybrid based on Monte Carlo simulations.

7. The system of claim 6, wherein the at least one processor is programmed to calibrate the forward hazard rate model based on Monte Carlo simulations.

8. The system of claim 5, wherein the discontinuous process is a Poisson process.

9. An article comprising a computer readable medium having stored thereon instructions, which when executed by a processor cause the processor to calculate a value of a credit hybrid by:

calibrating a forward hazard rate model that models the forward hazard rate based on a stochastic differential equation that includes a jump term for the hazard rate, wherein the stochastic differential equation is:

$$dh_{tT} = \mu_{tT}^h dt + \sigma_{tT}^h dB_t^h + G(h_{tT})dN_t$$

where T is the maturity of a corresponding hazard rate, $\mu_{tT}^h$ is a drift term, $\sigma_{tT}^h$ is a hazard rate volatility, $B_t^h$ is a continuous-time Brownian motion function, $G(h_{tT})$ is a non-negative function of the hazard rate $h_{tT}$, and $N_t$ is a discontinuous process with frequency $\lambda$, and $G(h_{tT})dN_t$ is the jump term; and calculating the value for the credit hybrid based on the calibrated forward hazard rate model.

10. The article of claim 9, wherein the discontinuous process is a Poisson process.

11. A method of calculating a value of a credit hybrid comprising:

calibrating, with a processor, a forward hazard rate model that models the forward hazard rate based on a stochastic differential equation that includes a jump term for the hazard rate, wherein the jump term is based on a non-negative function of the hazard rate and a discontinuous process and wherein the stochastic differential equation additionally includes a drift term for the hazard rate and a Brownian motion term for the forward hazard rate, and wherein the stochastic differential equation is:

$$dh_{tT} = \mu_{tT}^h dt + \sigma_{tT}^h dB_t^h + G(h_{tT})dN_t$$

where T is the maturity of a corresponding hazard rate, $\mu_{tT}^h$ is a drift term, $\sigma_{tT}^h$ is a hazard rate volatility, $B_t^h$ is a continuous-time Brownian motion function, $G(h_{tT})$ is a non-negative function of the hazard rate $h_{tT}$, and $N_t$ is a discontinuous process with frequency $\lambda$, and $G(h_{tT})dN_t$ is the jump term;

calculating, with the processor, the value for the credit hybrid based on the calibrated forward hazard rate model; and storing the value of the credit hybrid.

12. The method of claim 11, wherein calculating the value of the credit hybrid comprises calculating the value of the credit hybrid using Monte Carlo simulations.

13. The method of claim 11, wherein calibrating the forward hazard rate model comprises calibrating the forward hazard rate model using Monte Carlo simulations.

14. The method of claim 11, further comprising, after calculating the value of the credit hybrid, making a trade to hedge the credit hybrid.

15. The method of claim 11, wherein the discontinuous process is a Poisson process.

* * * * *

UNITED STATES PATENT AND TRADEMARK OFFICE
CERTIFICATE OF CORRECTION

| | | |
|---|---|---|
| PATENT NO. | : 7,873,575 B1 | |
| APPLICATION NO. | : 12/072174 | |
| DATED | : January 18, 2011 | |
| INVENTOR(S) | : Denis Gorokhov | |

It is certified that error appears in the above-identified patent and that said Letters Patent is hereby corrected as shown below:

Column 1, equation (2), the portion of the equation reading " $\mu_{tT}^{\ h} dt + \sigma_{tT}^{\ h} dB_t^{\ h}, B_t^{\ h} \in R^1$ " should read -- $\mu_{tT}^h dt + \sigma_{tT}^h dB_t^h, B_t^h \in R^1$ --

Column 1, line 31, delete " $\mu_{tT}^{\ h} dt$ " and substitute -- $\mu_{tT}^h dt$ --; line 32, delete " $B_t^{\ h}$ " and substitute -- $B_t^h$ --

Column 2, equation (4), the portion of the equation reading " $dh_{tT} = \mu_{tT}^{\ h} dt + \sigma_{tT}^{\ h} dB_t^{\ h} + G(h_{tT})dN_t, B_t^{\ h} \in R^1$ " should read -- $dh_{tT} = \mu_{tT}^h dt + \sigma_{tT}^h dB_t^h + G(h_{tT})dN_t, B_t^h \in R^1$ --

Column 2, lines 34 and 45, Column 3, line 48, Column 8, lines 12 and 52, Column 9, line 11, delete each occurrence of " $\mu_{tT}^{\ h}$ " and substitute -- $\mu_{tT}^h$ --

Column 1, line 31, column 2, lines 35, Column 8, lines 13 and 53, Column 9, line 12, Column 10, line 7, delete each occurrence of " $\sigma_{tT}^{\ h}$ " and substitute -- $\sigma_{tT}^h$ --

Column 1, line 32, column 2, line 35, column 8, lines 13 and 53, Column 9, line 12, Column 10, line 7, delete each occurrence of " $B_t^{\ h}$ " and substitute -- $B_t^h$ --

Column 2, line 47, delete " $\sigma_{tT}^{\ h} dB_t^{\ h}$ " and substitute -- $\sigma_{tT}^h dB_t^h$ --

Signed and Sealed this
Twelfth Day of April, 2011

David J. Kappos
*Director of the United States Patent and Trademark Office*

CERTIFICATE OF CORRECTION (continued)
U.S. Pat. No. 7,873,575 B1

Column 2, line 65, the equation reading "$\mu_{tT}^{HPF} = \sigma_{tT}^{h} \int^T \sigma_{ts}^{h} ds + \sigma_{tT}^{r} \cdot \kappa_t \int^T \sigma_{ts}^{h} ds + \sigma_{tT}^{h} \int^T \sigma_{ts}^{r} \cdot \kappa_t ds$,"
should read -- $\mu_{tT}^{HPF} = \sigma_{tT}^{h} \int^T \sigma_{ts}^{h} ds + \sigma_{tT}^{r} \cdot \kappa_t \int^T \sigma_{ts}^{h} ds + \sigma_{tT}^{h} \int^T \sigma_{ts}^{r} \cdot \kappa_t ds$ --

Column 2, line 66, delete "$\sigma_{tT}^{r}$" and substitute -- $\sigma_{tT}^{r}$ --

Column 3, equation (6), the portion of the equation reading "$h_{ij} + \mu_{ij}^{h} \delta_i + \sqrt{\delta_i} \sigma_{ij}^{h} B_{i+1}^{h} + G(h_{ij})(N_{i+1} - N_i)$,"
should read -- $h_{ij} + \mu_{ij}^{h} \delta_i + \sqrt{\delta_i} \sigma_{ij}^{h} B_{i+1}^{h} + G(h_{ij})(N_{i+1} - N_i)$ --

Column 3, line 20, delete "$\Theta_{ij}^{h}$" and substitute -- $\Theta_{ij}^{h}$ --; line 29, delete "$\Delta_k^{h}$" and substitute -- $\Delta_k^{h}$ --; line 48, delete "$\Delta_k^{r}$" and substitute -- $\Delta_k^{r}$ --; line 49 delete "$\Theta_{ij}^{h}$" and substitute -- $\Theta_{ij}^{h}$ --

Column 4, line 24, delete "$\sigma_{ij}^{h}$" and substitute -- $\sigma_{ij}^{h}$ --

Column 5, equation (12), the portion of the equation reading

"$\tilde{Z}_{0t_j} \frac{Z_{0t_j}}{Z_{0t_{j-1}}} E^Q \left\{ \exp\left( ds \int_0^{j-1} \left( \sum_{st_j}^{r} - \sum_{st_{j-1}}^{r} \right) \cdot \kappa_s \sum_{st_{j-1}}^{h} \right) \right\}$" should read -- $\tilde{Z}_{0t_j} \frac{Z_{0t_j}}{Z_{0t_{j-1}}} E^Q \left\{ \exp\left( ds \int_0^{j-1} (\sum_{st_j}^{r} - \sum_{st_{j-1}}^{r}) \cdot \kappa_s \sum_{st_{j-1}}^{h} \right) \right\}$ --; equation (13), the portion of the equation reading "$\sum_{tT^r} = -\int^T ds \sigma_{sT^r}$" should read -- $\sum_{tT}^{r} = -\int^T ds \sigma_{sT}^{r}$ --; equation (14), the portion of the equation reading "$\sum_{tT^h} = -\int^T ds \sigma_{sT^h}$" should read -- $\sum_{tT}^{h} = -\int^T ds \sigma_{sT}^{h}$ --

The portion of the equation in claims 1, 5, 9, and 11 reading "$\mu_{tT}^{h} dt + \sigma_{tT}^{h} dB_t^{h} + G(h_{tT}) dN_t$," should read -- $\mu_{tT}^{h} dt + \sigma_{tT}^{h} dB_t^{h} + G(h_{tT}) dN_t$ --